United States Patent [19]

Kelz

[11] 4,040,776
[45] Aug. 9, 1977

[54] PRESSURE MOULDING MACHINES AND MOULD PARTS THEREFOR

[76] Inventor: Norbert R. Kelz, 45 Knoll Street, Port Colborne, Ontario, Canada

[21] Appl. No.: 637,332

[22] Filed: Dec. 3, 1975

Related U.S. Application Data

[62] Division of Ser. No. 390,270, Aug. 21, 1973, Pat. No. 3,942,928.

[51] Int. Cl.² .............................................. B29F 1/00
[52] U.S. Cl. ................................... 425/145; 425/166; 425/171
[58] Field of Search ............. 425/145, 166, 154, 171; 92/9

[56] References Cited

U.S. PATENT DOCUMENTS

| 2,838,140 | 6/1958 | Rasmusson et al. | 92/9 X |
| 3,176,801 | 4/1965 | Huff | 92/9 X |
| 3,632,251 | 1/1972 | Henry | 425/166 |
| 3,642,405 | 2/1972 | Eggenberger et al. | 425/167 |
| 3,647,309 | 3/1972 | Thompson | 425/145 X |
| 3,840,313 | 10/1974 | Grundmann | 425/171 |
| 3,897,680 | 8/1975 | Grundman et al. | 425/171 X |

Primary Examiner—Robert L. Spicer, Jr.
Assistant Examiner—William R. Briggs
Attorney, Agent, or Firm—Hirons & Rogers

[57] ABSTRACT

In a pressure moulding machine, particularly a die casting machine, detection of locking together of the die parts by the applied pressure is effected by detecting the resulting mechanical stretch in the machine frame; the die parts are opened and closed together by an air motor associated with a hydraulic motor that damps the opening and closing movement of the dies, the die parts being locked together by the hydraulic motor; full closing of the die parts is determined by applying pressurized air to bores therein and to a controlling pressure switch, the pressure switch not being operable if air is leaking from the bores.

9 Claims, 8 Drawing Figures

PRESSURE MOULDING MACHINES AND MOULD PARTS THEREFOR

CROSS-REFERENCE TO RELATED APPLICATION

This application is a division of my application Ser. No. 390,270, filed Aug. 21, 1973, now U.S. Pat. Ser. No. 3,942,928.

FIELD OF THE INVENTION

The present invention is concerned with improvements in or relating to pressure moulding machines, especially to die casting machines, and in or relating to mould parts for such machines.

REVIEW OF THE PRIOR ART

Die casting is a widely employed technique using various metals (usually of relatively low melting point) and plastic materials, because of the possibility for inexpensive production of relatively complicated shapes once a suitable die mould has been provided. A common way of increasing production in this field is use of a machine of increased size as to the weight of cast material employed in a single shot, and then to provide a multiple-cavity mould with the maximum number of cavities that can be used.

Such large machines however introduce their own problems in that they are high pressure machines inherently that are expensive to manufacture and operate. Moreover, because of the large size of the moving parts, involving considerable inertias they are somewhat slow in operation, resulting in fewer "shots" per unit time. The large multi-casting dies are expensive and any damage thereto is consequently more costly. It is also found that difficulty is experienced in obtaining castings of the required quality from all of the cavities, usually due to inadequate flow of material through the passages provided in the die for that purpose, and the inadequately-fed cavities must be closed off, resulting in decrease in production.

DEFINITION OF THE INVENTION

The approach to achieve high economic production employed with machines in accordance with the invention is to provide a simple, fast-acting machine capable of safe, automatic, relatively unattended operation. Such a machine can therefore be employed with dies having only a small number of cavities, usually only one cavity, and yet can achieve an economic high production rate because of the speed at which it can be got into satisfactory operation, the relatively high number of shots can be obtained per unit time, and the possibility that several of such machines on automatic operation can be tended by a single operator. It will be seen that such a machine provides for high flexibility of operation, particularly for a manufacturer involved with relatively short production runs.

Nevertheless, the principles embodied in machines in accordance with the invention are applicable to die casting machines in general, and not only to the small machine particularly described herein by way of example.

It is the principal object of the present invention to provide a new die-casting machine and new mould parts therefor.

It is a more specific object to provide a new machine especially suitable for safe relatively unattended operation.

It is another more specific object to provide a new machine adapted for fast automatic operation.

In accordance with the present invention there is provided a pressure moulding machine comprising a base, a machine frame mounted on the base with one end fixed to the base and the other end movable thereon, means on the frame mounting two mould parts for movement relative to one another for opening and closing the mould constituted by the mould parts, motor means mounted by the frame and operatively connected to one mould part to move it relative to the other part and to hold the parts in engagement with one another under pressure, a mechanical movement detector mounted on the machine to be operative between the frame and the base for detecting movement of the movable end of the machine frame resulting from stretch of the machine frame under said pressure engagement of the mould parts by the motor means, a pump mounted by the machine injecting material into the die during a moulding operation, and control means responsive to detection by the movement detector of a predetermined movement of the movable frame end for at least initiating operation of the said pump.

In such a machine the said motor means may comprise a hydraulic motor mounted by the frame and operatively connected to one mould part for holding the parts in pressure engagement with one another during a mould filling operation; an air motor mounted by the frame and operatively connected to one mould part for moving the parts relative to one another for opening and closing the mould; means for operating the air motor to open and close the mould; and means for operating the hydraulic motor while the mould is closed and a mould filling operation takes place.

In such a machine at least one mould part may be provided with a bore therein opening to the respective mating mould face at a point spaced from the mould cavity, and there may be provided means supplying air under a pressure different from ambient to the said bore, means detecting movement of air from the said bore by lack of mating engagement of the mould faces, and means controlling the motor means to control the mould filling operation under control of the said air movement detecting means.

DESCRIPTION OF THE DRAWINGS

A die casting machine which is a particular preferred embodiment of the invention will now be described, by way of example, with reference to the accompanying drawings wherein.

DESCRIPTION OF THE PREFERRED EMBODIMENTS

Figure 1:
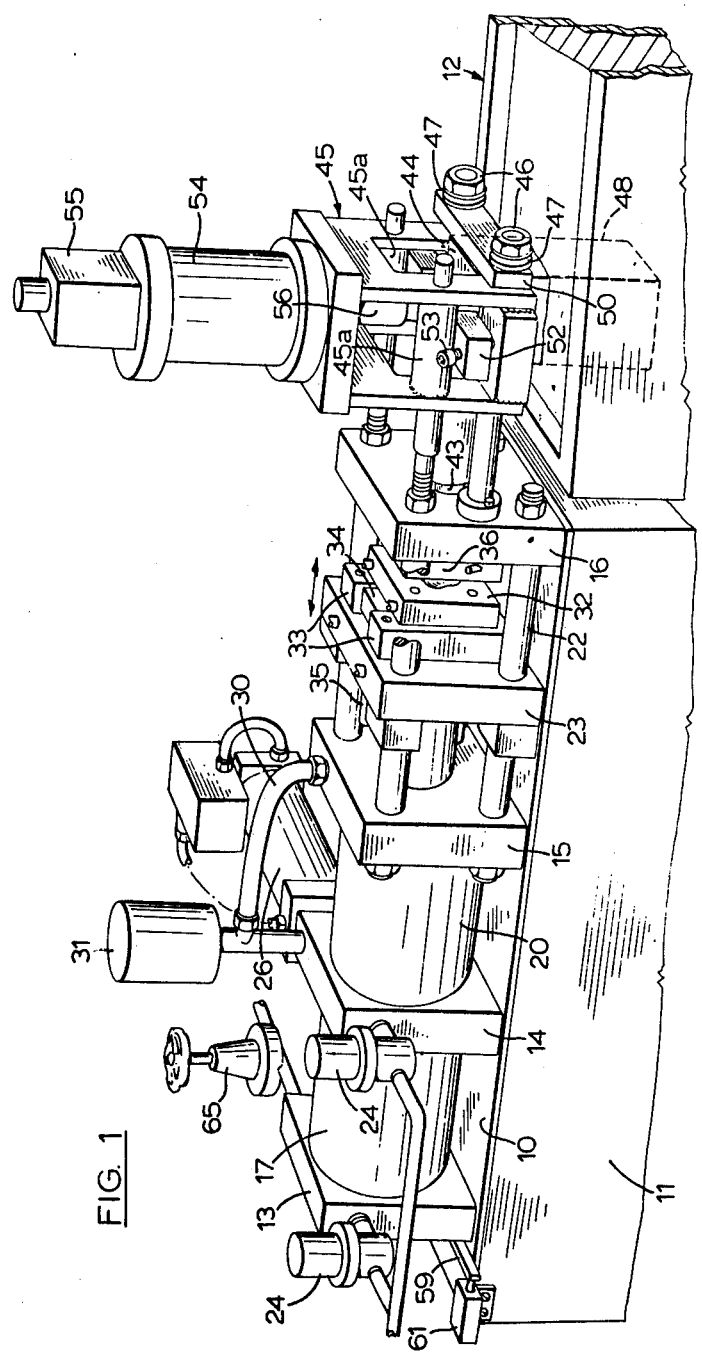
FIG. 1 is a general perspective view to show the main structure of the machine.

As indicated above, the moulding machine to be particularly described is a die-casting machine intended for the casting of objects from readily melted metals, such as zinc, lead, aluminum and their alloys. The application of the invention to machines for moulding and casting from other materials will be apparent to those skilled in the art.

The machine is mounted on the flat-top 10 of a table 11 to be at a convenient height for the operator, while the necessary electrical operating equipment such as relays, switches, indicator lights and meters etc. are mounted on a suitable console (not shown) alongside the table. A bath 12 of the liquid metal to be cast is provided at one end of the table, the bath being provided with conventional pre-heating facilities for metal ingots which are fed thereto, and with a conventional thermostatic control (not illustrated) to maintain the metal in the bath at the desired liquidus temperature.

The basic machine structure involves four spaced, parallel flat rigid plates 13 through 16 which are rigidly connected to one another. The plate 16 is fastened to the table top 10 while the other plates are permitted to slide freely thereover, as will be further described below. The plates 13 and 14 have interposed between them a cylindrical member 17 constituting an air or pneumatic cylinder containing a double-acting piston 18 mounted on a piston rod 19 carried in suitable bearings in the plates 13 through 15. The plates 14 and 15 have interposed between them a cylindrical member 20 constituting a liquid or hydraulic cylinder containing a double-acting piston 21 also mounted on the shaft 19. The plates 15 and 16 are connected together by four relatively massive rods 22, which also constitute slide guides mounting a movable die platen 23 which is fixed to the end of the piston rod 19 and is moved thereby toward and away from the plate 16, which constitutes the cooperating fixed die platen.

Figure 3:
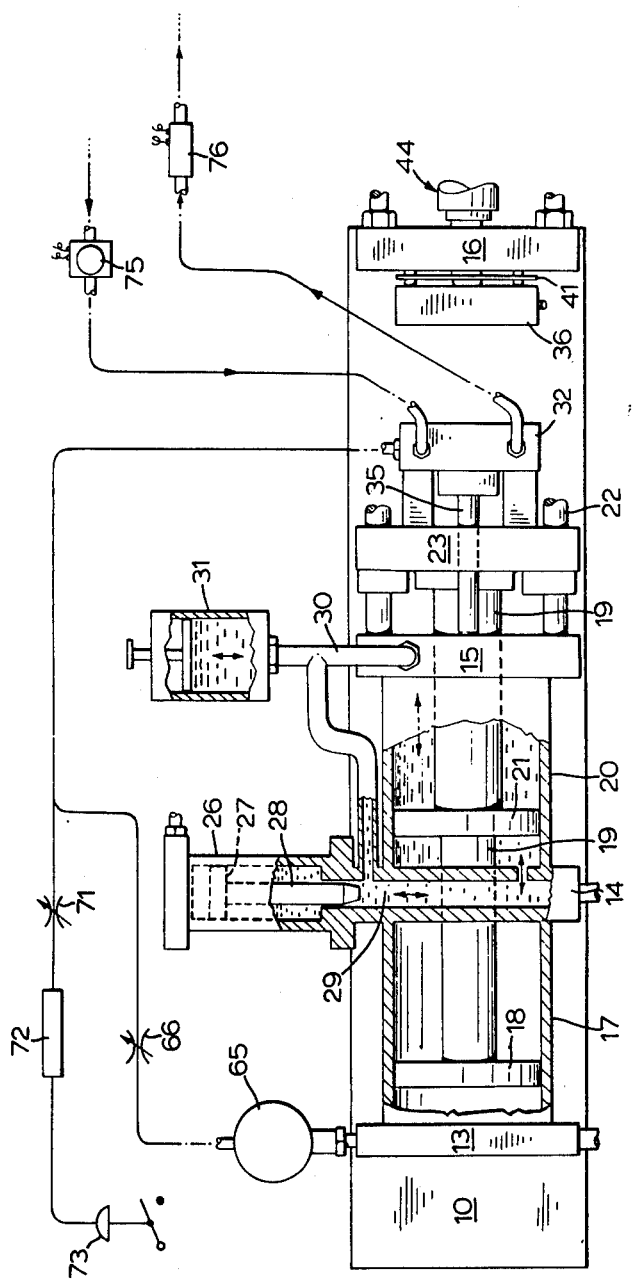
FIG. 3 is a schematic of the machine to permit description of the manner in which the die parts are moved toward each other and locked together during the die casting operation.

Air under pressure is supplied from a suitable source to one or other side of the piston 18 under the control of respective solenoid valves 24. This air is also supplied under the control of a valve 25 to an air-operated hydraulic booster motor 26 mounted to one side of the plate 14 and having a double-acting piston 27 mounted on a piston rod 28 that can protrude into a special passageway section 29 provided in the plate 14. With the piston 27 in the retracted position shown in FIG. 3 the liquid in the hydraulic circuit can pass relatively freely from one side of the piston 21 to the other via a connecting pipe 30, a pressurized reservoir 31 being provided to maintain the circuit full of liquid.

The movable platen 23 is water-cooled and a water-cooled movable or ejector die mould part 32 is mounted on two transversely-spaced spacer plates 33 which are in turn mounted on the platen 23. The ejector mechanism illustrated herein comprises a plate 34 mounted on two pins 35 which slide freely in the platen 23 and force the plate 34 against the back of the ejector die 32 as the dies open by the engagement of the pins with plate 15; the ejector pins in the die (not shown) are forced forward by the plate 34 to eject the cast workpiece. Any other ejector means common in the art can of course be used in place of those particularly described, such as a separate piston rod coaxial with the rod 19 and operated at a specific time in the machine operation.

Figure 4:
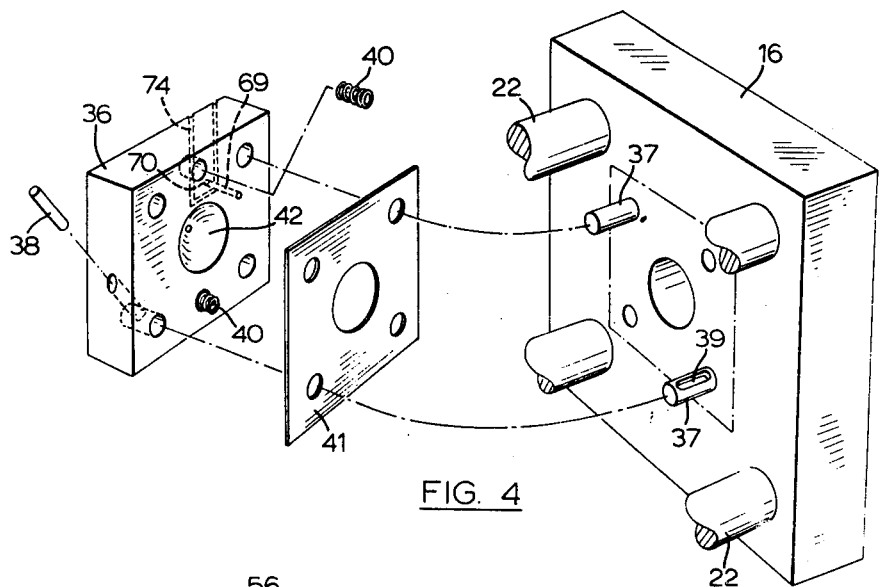
FIG. 4 is an exploded view of the "fixed position" die part to show its construction.
Figure 5:
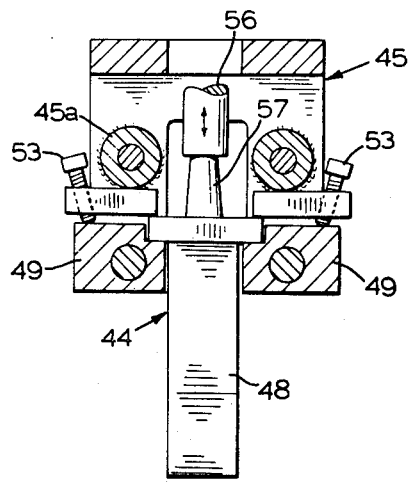
FIG. 5 is a view taken on the line 5—5 of FIG. 2, to show the arrangement for mounting the machine pump.

Referring now especially to FIG. 4, the fixed or cover die mould part 36 of the invention differs from that known hitherto in that it is mounted to the fixed platen 16 by means which locate it accurately transversely of the platen, but which permit it to move longitudinally as the dies are opened and closed. In the embodiment particularly illustrated the die 36 is mounted for such movement on two parallel rods 37 extending from the platen 16 and is retained thereon by a pin 38 which enters a longitudinally elongated slot 39 in one of the rods 37. The die carries two compression springs 40 which engage a soft metal washer 41 (whose function will be described below) and urge the die away from the platen.

A concave recess 42 in the rear face of the die receives the nozzle 43 of the metal pump 44 to be described below. The pump also is mounted to be movable longitudinally of the machine and for this purpose a frame 45 mounting the pump is slidably mounted on extensions of the rods 22 by means of bearings such as 45a. The ends of the two lower rods 22 are screw-threaded and are provided with adjusting nuts 46 engaging respective spring belleville washers 47. The pump housing 48 slides on guides 49 and is held against longitudinal movement by a bar 50 engaged by the washers 47 and engaging the housing via a central vertical pivot bar 51. The pump housing extends downwards into the metal bath and is held against vertical movement by clamp bars 52 reacting against the upper bearings 45a and held by adjusting screws 53.

The pump is actuated when required by an air-operated motor 54 controlled by a solenoid valve 55, the plunger 56 of the motor being separably connected to the piston 57 of the pump. The part of the pump nozzle between the housing and the back of the platen 16 is surrounded by a shroud 58 into which a gas torch discharges to pre-heat the nozzle and to prevent the metal freezing therein.

Figure 2:
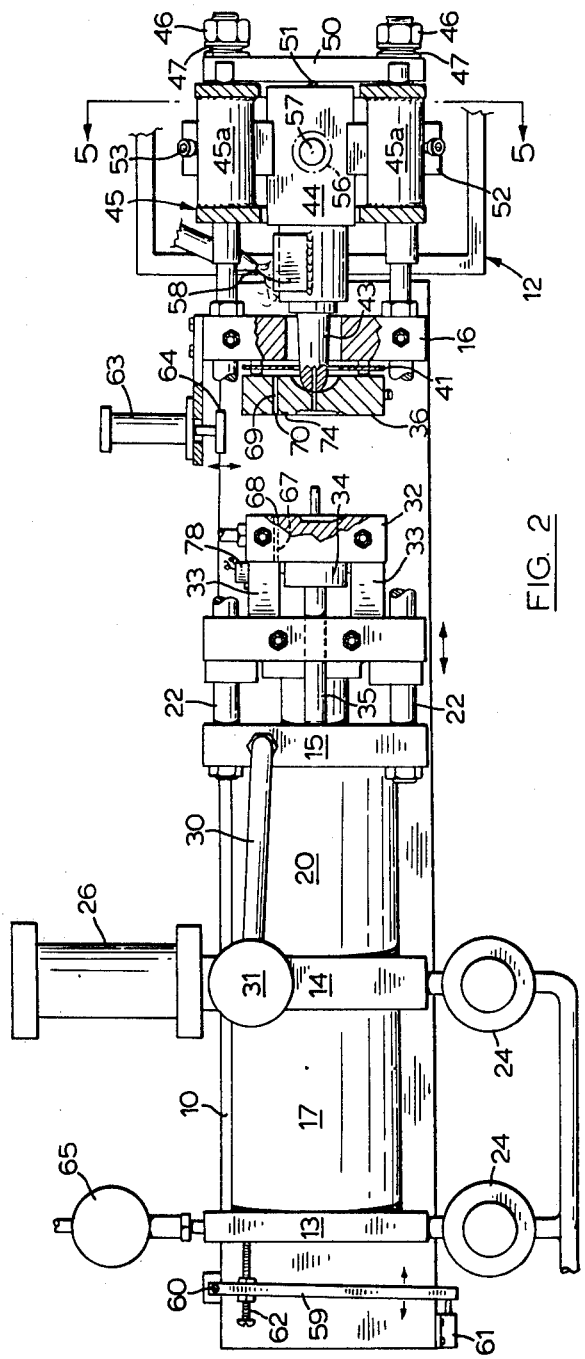
FIG. 2 is a plan view from above with parts broken away as necessary to show the construction.

Referring especially to FIG. 2 a lever 59 has one end pivoted at 60 to the table top 10, while the other end engages the control member of a sensitive micro-switch 61. A longitudinally-adjustable contact screw 62 mounted on the lever close to the pivot 60 engages the end plate 13. It will be seen that the lever detects and amplifies any longitudinal movement of the end plate 13, which slides freely on the table, and actuates the switch 61 when this movement is a predetermined amount. Another air-operated motor 63 controls the movement of a head 64 to spray the dies with a small quantity of a lubricant after each moulding operation.

Some of the pressurized air that is fed to the air motor 17 is bled therefrom via a regulator 65 and fed via a variable orifice 66 to a passage 67 in the movable die, this passage discharging from the die face that mates with the corresponding face of the fixed die via an orifice 68 that is spaced from the respective part of the mould cavity. A passage 69 in the fixed die has an orifice 70 also spaced from the respective part of the mould cavity and registering with the orifice 68, this passage passing completely through the die. A variable timing orifice 71 is connected between the orifice 66 and passage 67 and is connected via a timing reservoir 72, which in this embodiment consists merely of the length of pipe 72, to a pressure sensitive switch 73. A vent groove 74 is provided around the orifice 70 to ensure that any air escaping therefrom cannot reach the die cavity while the dies are closed and it is full of molten metal. A check valve 93 allows the reservoir to empty quickly when pressurised air is no longer fed thereto. The dies are supplied with water for cooling purposes via a solenoid-controlled valve 75 while the temperature of the water discharged therefrom is detected by a sensor 76.

In operation of the device the pump is placed in position, the pump body sliding easily into place since its operative dimensions are calculated to be exact when it is at the operating temperature. The pump is now heated by its contact with the hot metal in the bath and by the torch until it is at the desired operating temperature. The dies are mounted in position and the air and water hoses connected thereto.

Pressurised air (e.g. at about 80-100 p.s.i.) is now supplied to the air motor 17 which moves the piston 18 forward (to the right as seen in the figures) to close the dies together. This forward movement is dampened in a desired manner by the movement of the piston 21 in its cylinder since this must be accompanied by flow of liquid from one side to the other. With the piston 18 in its fully forward position the booster motor 26 is now operated by admitting air thereto. The first movement of the piston closes the by-pass passage against movement of liquid therein, and subsequent movement increases the pressure in the hydraulic cylinder to the value required for complete closing of the die while the moulding operation takes place (e.g. about 2000 p.s.i.)

One effect of the application of these high pressures is to stretch the whole machine, especially between the plates 14 and 16 which are subjected to the hydraulic pressure, and the end plate 13 slides a corresponding small amount (e.g. about 0.005 inch) on the table top 10. The movement detector constituted by the lever is now adjusted until the switch is just positively operated by a movement of this extent. It will be seen that detection by this means is extremely positive, in that it is only effective if the required pressure is applied, and then only if this pressure is applied via the closed dies, since otherwise the body of the machine cannot stretch. This may be contrasted with an arrangement for example in which the hydraulic pressure is measured; the maximum pressure will be obtained and indicated even in cases where the dies may be jammed open.

Although in this specific embodiment a mechanical movement detector has been described, comprising a lever system providing amplification of the dimensional change of the machine frame, other detectors can be employed, such as optical or electrical devices used for measuring and indicating small mechanical displacements.

The pump is now moved longitudinally by operation of the adjusting nuts 46 until the pump nozzle 43 is pressed sufficiently firmly into the rear recess 42 in the die for the liquid metal to be fed to the die without substantial leakage. The machine is now essentially ready for operation, subject to various minor adjustments that will be described below.

As described above, the machine is now operated by supplying air to the motor 17, whereupon the dies close together. If the dies do not close fully, or if the movable die 36 is not pressed firmly home against the washer 41 and the fixed platen 16, then air escapes and the pressure applied to the switch 73 is insufficient to operate it and the machine cannot continue its operation until the attendant has checked the reason for the failure. The function of the soft washer 41 is to prevent malfunction in the event that a minor foreign body, such as a small piece of dirt, becomes interposed between the die part 36 and the fixed platen 16; such a body instead becomes embedded in the washer under the pressure applied thereto.

With the dies fully closed the switch 73 is operated after a period of time determined by the parameters of the variable orifices 66 and 71 and of the reservoir 72. The booster motor 26 can now be operated and increases the clamping pressure between the die parts to the elevated value necessary for the casting operation. The switch 61 detects whether or not the required pressure has been applied by the booster motor and, if so, permits operation of the pump motor to force a "shot" of liquid metal into the die. After a predetermined period required for solidification of the cast workpiece the operation of the booster motor 26 is reversed releasing the pressure, and thereafter the operation of the motor 17 is reversed to open the die parts, the workpiece being ejected as the ejection pins 35 become operative. While the die parts are opened the motor 62 is operative and moves the spray head 64 to spray the cavity faces with a release agent. The cycle then repeats.

Figure 6:
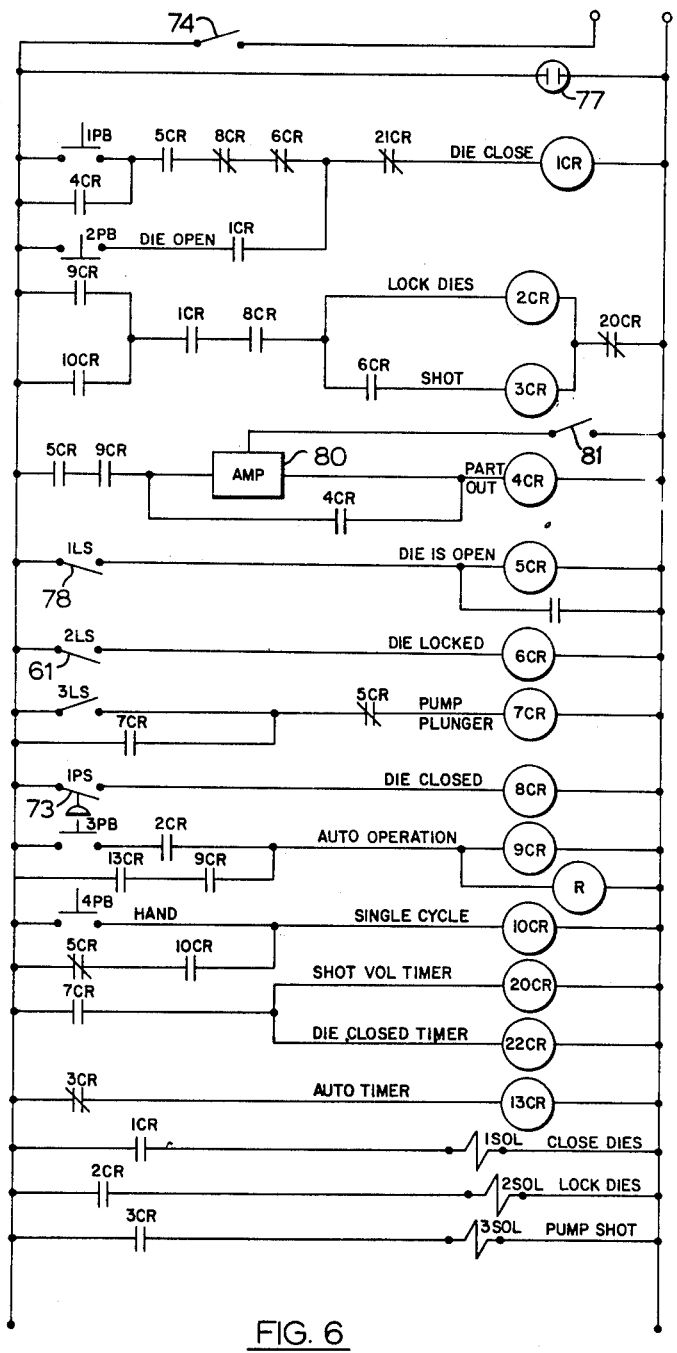
FIG. 6 is a schematic diagram of the electrical circuit of the machine.

Referring now to the schematic circuit diagram of FIG. 6 power is supplied from a conventional source via main switch 74 to two busbars between which the various switches and relays etc., are connected, the conventional indicator light 77 being provided.

To open and close the dies under control of the operator, as described above for adjustment of the switches, etc., push button 1PB is closed and energises relay 1CR. If the dies are open and retracted then a switch 78 (ILS) adjustably mounted on the plate 33 and operated by the retracted movable die is open and relay 5CR is not operated; the switch 73 (IPS) will also be open and relay 8CR not operative; the switch 61 (2LS) also is open and the relay 6CR inoperative; with closure of 1PB the dies are moved together by air motor 17 under control of the respective relay valve 24 (1 SOL). The normally open contacts 1CR in series with normally closed contacts 2PB keep relay 1CR and solenoid 1SOL energised. Pressing 2PB opens its contacts and energises 1CR and 1SOL to open the dies.

To run with operator controlled single cycles the dies are closed by 1PB and 4PB is then pressed momentarily to energise 10CR which is then held energised by associated 5CR and 10CR contacts. If 1CR and 8CR are energised then 2CR will energise to energise 2SOL for operation of valve 25 and consequent operation of the booster motor, locking the dies closed. 2LS is now actuated by the stretch of the machine and 3CR is energised, energising 3SOL to operate valve 55 and drive down the plunger of the metal pump. As the pump plunger begins to descend 3LS is actuated to energise relay 7CR, which is then locked energised and in turn applies power to a shot timer relay 11CR and a die timer relay 12CR. When the shot timer relay 11CR times out and energises it de-energises 2CR, 2SOL, 3CR and 3SOL to unlock the dies and returns the pump piston to its upper position, stopping the feeding of metal to the dies. When the die closed timer relay 12CR times out it de-energises 1CR and 1SOL to open the dies. When the dies are open ILS energises 5CR which terminates the single cycle by de-energising 10CR; power is then removed from 11CR and 12CR by de-energisation of 7CR.

For automatic operation the dies are closed and 4PB is pressed as before. When 6CR is energised and the machine locked then 3PB is pressed momentarily to energise 9CR which is then locked in, the relay 9CR replacing the single cycle relay 10CR. The cycle proceeds as before until the dies are open and the moulded part has been ejected. Power is now applied to the part sensing amplifier 80 which senses the part by its operation of switch 81 and energises 4CR, which in turn energises 1CR and 1SOL to close the dies and start the next cycle. The timing of the auto-timer relay 13CR is stopped when 3CR is energised and re-started when it de-energises; the machine continues to cycle until power is removed or if re-cycling does not occur within an allotted time and 13CR times out.

The die closed detector constituted by the die orifices, associated air supply and switch 73 also functions as a temperature detector for the die to ensure that it does not become overheated or overcooled. Thus if the die becomes locally overheated its mating faces in contact with the hot metal expand and bend to a convex shape, permitting air to escape and increasing the period required to operate the switch 73(1PB). If this effect becomes too great then the timing relay 13CR will time out before 1PB is operated stopping the machine completely. A similar effect is obtained if the die runs too cool because of excessive water to the rear of the die, so that the die will be maintained at the high temperature preferred for free flow of the metal to give good casting quality and long die life.

It is also found that apparatus in accordance with the invention provides during operation an inherent self-regulation of the termperature of the pump nozzle 43. For example, if the nozzle becomes too hot it will expand in length beyond the optimum setting and increase its contact pressure with the die recess 42, thereby increasing the heat transfer between them. In addition there is an increase in the time interval between the instant when the dies are closed by the motor 17, and those when the dies are locked by motor 26 and a shot of metal is pumped to the die, since the pump must be moved backwards a greater distance against the spring 47 and more pressure must therefore be applied; this increasing time interval again increases the temperature loss to the die. The effects are reversed if the nozzle is too cool, giving the nozzle greater opportunity to heat to the optimum temperature.

Figure 7:
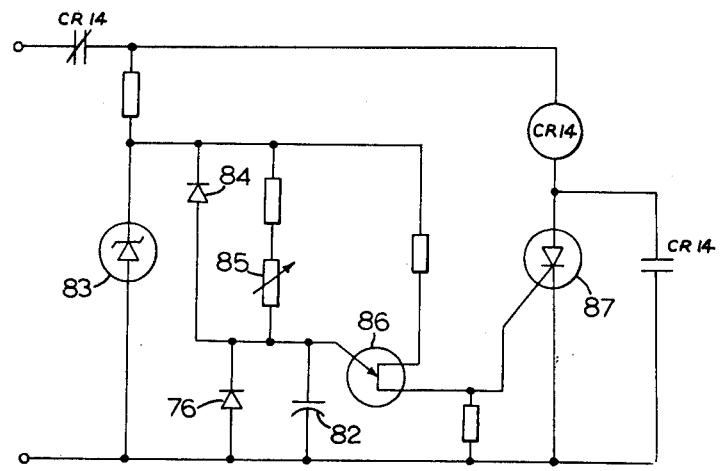
FIG. 7 is a schematic diagram of a die temperature control circuit.

FIG. 7 shows an addition to the electrical circuit to give automatic control of the die temperature, as described above, by modulation of the period for which water flows in the dies. Thus, the detector 76 illustrated in FIG. 1 is a diode, thermistor or other temperature sensitive impedance connected in shunt with a capacitor 82. The capacitor is supplied with charging current via switch contacts CR14, a voltage controlling zener diode 83, an ambient temperature compensating diode 84 and a time-setting variable resistor 85. As the temperature of detector 76 increases its impedance decreases, increasing its shunting of the capacitor 82 and increasing the time required before a unijunction transistor 86 is energised, in turn energising an SCR device 87 and the relay CR14 which controls water valve 75. As the temperature increases therefore the period for which the valve 75 is open increases to increase the quantity of water supplied thereby to the dies.

Figure 8:
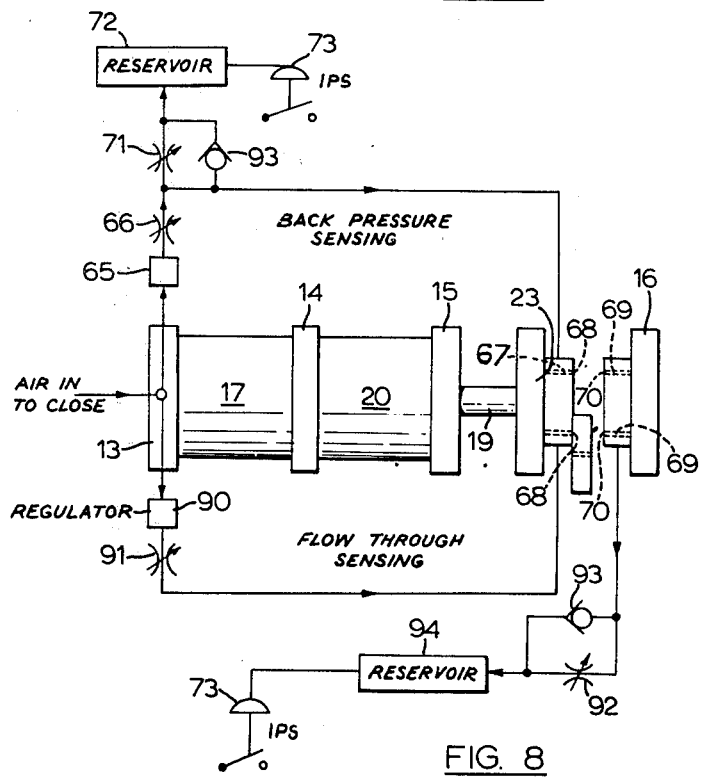
FIG. 8 is a schematic diagram showing two alternative systems for detecting the closing of the dies for injection of the metal shot.

FIG. 8 illustrates an alternative system for sensing the closing of the dies in addition to the back pressure system already described above. In this alternative system a regulator 90 feeds through a variable orifice 91 to the fixed die 23 and thence through orifices 68 and 70 to a bore 69 in the movable die 36. The bore 69 feeds the air thus received to a timing orifice 92 and a check valve 93 to the reservoir 94 and valve 73. The check valve 93 allows the reservoir to drain quickly when the dies open so that it is again ready to perform its timing function. which is an amplification of the corresponding movement of the machine frame end.

I claim:

1. A pressure moulding machine comprising a base, a machine frame mounted on the base with one end fixed to the base and the other end movable thereon, means on the frame mounting two mould parts for movement relative to one another for opening and closing the mould constituted by the mould parts, motor means mounted by the frame and operatively connected to one mould part to move it relative to the other part and to hold the parts in engagement with one another under pressure, a mechanical movement detector mounted on the machine to be operative between the frame and the base for detecting movement of the movable end of the machine frame resulting from stretch of the machine frame under said pressure engagement of the mould parts by the motor means, a pump mounted by the machine injecting material into the die during a moulding operation, and control means responsive to detection by the movement detector of a predetermined movement of the movable frame end for at least initiating operation of the said pump.

2. A machine as claimed in claim 1, wherein the mechanical movement detector comprises a lever pivoted to the base and engaging the machine frame, and said control means include an electric switch which has its operator member engaged with the lever for movement thereby.

3. A machine as claimed in claim 1, wherein the said motor means comprises a hydraulic motor mounted by the frame and operatively connected to one mould part for holding the parts in pressure engagement with one another during a mould filling operation; an air motor mounted by the frame and operatively connected to one mould part for moving the parts relative to one another for opening and closing the mould; valve and pipe means supplying air to the air motor to open and close the mould; and valve and pipe means supplying operating liquid to the hydraulic motor while the mould is closed and a mould filling operation takes place.

4. A machine as claimed in claim 3, wherein both the air and hydraulic motors are piston motors with their pistons operatively connected to the same mould part and movable simultaneously with one another.

5. A machine as claimed in claim 4, wherein the hydraulic motor includes passage means connecting the ends of the cylinder and permitting restricted flow of hydraulic liquid therein from one side of the piston to the other during movement of the hydraulic motor by operation of the air motor, whereby the hydraulic motor functions as a hydraulic unit damping movement of the mould parts together by operation of the air motor.

6. A machine as claimed in claim 5, and including a second air motor having a hydraulic piston movable in said passage means of the hydraulic motor, movement of said hydraulic piston by the second air motor in one direction closing the said passage means against the restricted liquid flow therein and thereafter pressurising the hydraulic liquid inside the hydraulic motor on the side of the piston such that the hydraulic motor holds the mould parts in said pressure engagement.

7. A machine as claimed in claim 1, wherein a first mould part has a bore therein opening to the respective mating mould face at a point spaced from the mould cavity, the machine including pipe means supplying air under a pressure different from ambient to the said bore, means connected to the said pipe means and detecting movement of air from the said bore by lack of mating engagement of the mould faces, and means controlling the mould filling operation under control of the said air movement detecting means.

8. A machine as claimed in claim 7, wherein the means controlling the mould filling operation comprises an air pressure operated switch, and the means detecting the movement of air includes an air reservoir interposed in said pipe means between the bore and the switch, whereby movement of air by said lack of mating engagement increases the period required to fill the air reservoir and thereafter operate the switch.

9. A machine as claimed in claim 7, wherein the second mould part is movably mounted in the frame and is pressed into engagement with the frame by its pressure engagement with the first mould part, the second mould part having a second bore therein registering with the bore in the first mould part, and wherein the air movement detecting means detect escape of air from the second bore due to lack of pressure engagement of the second mould part with the frame.

* * * * *